X-RADIATION-TO-ELECTRICAL SIGNAL TRANSDUCER

Filed Sept. 24, 1962

REIMANN L. STROBLE
JAMES A. SYBELDON,
DECEASED.
BY SYLVIA A. SYBELDON
ADMINISTRATRIX
INVENTORS

BY Irving Kayton
ATTORNEY

3,331,979
X-RADIATION-TO-ELECTRICAL SIGNAL TRANSDUCER

James A. Sybeldon, deceased, late of Milwaukee, Wis., by Sylvia A. Sybeldon, administratrix, Green Bay, Wis., and Reimann L. Stroble, Milwaukee, Wis., assignors to General Electric Company, a corporation of New York Filed Sept. 24, 1962, Ser. No. 225,929
6 Claims. (Cl. 313—64)

This invention has to do with X-radiation image intensification systems and particularly, with the transducer tube used in such systems and pertains especially to means for improving the operating characteristics of such a tube.

Television pickup systems sensitive to, and operative in, the X-ray rather than the visible ray spectrum, have become well known in the art. In the X-ray sensitive television system embodiment of interest in this invention, the operation of the television system is similar in almost all respects to the typical closed circuit television system. Thus, the X-ray camera or pickup tube operates in substantially the same way as does the well-known Vidicon tube of a visible spectrum system, and in accordance with similar general principles. This type of television X-ray system is one included in the general class of X-ray image intensification systems, and is described in United States Patent No. 2,890,360, issued June 6, 1959, and invented by John E. Jacobs.

The X-ray camera or pickup tube (hereinafter called X-transducer) of such a system basically comprises an electron gun and a mesh-target assembly, as well as the other electrodes necessary for proper operation, sealed into an evacuated envelope. The X-transducer converts a latent X-ray image into correlated electrical signals by virtue of a photoconductive layer (which is the target) mounted adjacent to the mesh. During operation of the X-transducer tube, the function of the electron gun is to try to maintain a predetermined and fixed difference of potential across the photoconductive layer. The photoconductive layer, during the operation of the tube as a TV camera pickup tube, is irradiated by a source of X-rays through the object under examination. The X-rays impinging upon the photoconductive layer cause local changes in the electrical resistivity of the layer of magnitudes proportional to the X-ray intensity variations present in the latent image projected on to the photoconductive target. These variations in resistivity cause greater or lesser amounts of current to be drawn from the electron beam scanned over the target surface by the electron gun. In particular, the greater the magnitude of the X-radiation impinging on the photoconductive layer, the greater will be the decrease in resistivity, and therefore the greater the current flow. These current variations produce a varying output signal from the X-transducer which, with appropriate television amplification circuitry, is converted into a television display of the X-ray image upon a standard TV monitor.

For purposes of safety, it is desirable that the X-radiation illuminating the test object, whether it be for industrial or medical X-ray purposes, be kept at as low level as is possible. This requirement results in certain difficulties in the operation of an X-ray image intensification system. Thus, for example, United States Patent No. 3,009,079, entitled "X-ray Intensification System," by J. E. Jacobs, issued Nov. 14, 1961, is directed to means for eliminating, or at least considerably reducing, blurring in the television X-ray image, while nevertheless maintaining the X-ray illumination intensity of the subject at the required safe, low level. Other problems in the operation of the X-transducer are the immediate concern of the instant invention. These problems are not only in the low X-ray illumination level required but also in the fact that the properties of an X-ray television camera tube are not precisely the same as in a visible light camera tube in that there are physical-chemical differences in the type of radiation and in the photoconductive target materials.

One of these problems has to do with the fact that when the image that is picked up by the X-transducer is in turn displayed on the standard TV monitor, the photoconductive target output lead, upon which the video signal is transmitted through amplification stages to the TV monitor, appears on the TV monitor screen as a dark image which stands out strikingly in contrast to the rest of the screen, while a white halo surrounds the entire target image. Although the causes for these defects are not known definitively, and there are many plausible explanations, it is presently believed that they are due to the primary electron scan beam from the electron gun scanning beyond the edge of the target and striking the target leads and glass wall of the envelope. Secondary emission phenomena may result from this over-scan, with secondary electrons being responsible for the spurious images (and for spurious dark current readings).

In accordance with the principles of the invention, these difficulties, i.e., the dark image of the target lead, the white halo, and spurious dark current, have been literally eliminated. The structure in accordance with the invention precludes the electron scan beam from striking any region external to the target electrode proper, irrespective of the magnitude of beam deflection. In one form, the structure comprises an annular ring of non-magnetic, electrically conductive material disposed in a plane parallel to, and at the same electrical potential as, the mesh electrode. It is located between the mesh and the electron gun such that the electron beam at its widest scan deflection forms a straight line to, but not beyond, the edge of the target. A wider deflection is precluded since the electrons are intercepted by the inner edge of the annular ring.

In another form, the geometry of the structure is a hollow cylinder also at the same electrical potential as the mesh electrode. The cylinder is disposed with its longitudinal axis perpendicular to the plane of the mesh, and with one circular edge of the cylinder closely adjacent to the circumference of the mesh-target assembly. In fashion similar to the annular ring, the electron beam at its widest deflection in the scanning operation cannot extend beyond the edge of the target, since it would intercept the inside surface of the cylindrical structure.

In the preferred embodiment of the invention, hereinafter to be described in detail, both the annular ring and the cylinder are utilized jointly and in cooperation with each other to provide maximum benefit. With this non-magnetic electrically conductive annular ring and cylinder maintained at the same electrical potential as the mesh electrode itself, there are two complementary geometries for shielding the periphery of the target electrode to thereby preclude the primary beam of the electron gun from striking the target leads or other peripheral structure.

This structure, in accordance with the principles of the invention, has other and independently important advantages in the operation of the X-transducer. One of them is that the cylinder, maintained at the potential of the mesh, functions effectively as an accelerating electrode within the X-transducer. As a consequence, the platinum coating on the inside surface of the front portion of the X-transducer tube, which heretofore had been utilized as an accelerating electrode, may be completely eliminated. Elimination of the platinum coating tends to reduce mesh-target capacity which in itself may contribute to other spurious images in the television display. Furthermore, elimination of the platinum coating permits easier visual checking of the tube assembly during its fabrication and subsequent final inspection. Actually, the electrostatic lens thus formed between the astigmatism or focusing electrode and the mesh electrode is strengthened by the utilization of the cylindrical shield.

Another independent advantage of the invention derives from a feature which heretofore could not be utilized, but which now, in accordance with the principles of the invention, may be used in combination with the geometries discussed above. The X-transducer envelope is sealed and under vacuum. Typical pressures are $10^{-5}$ to $10^{-6}$ millimeters of mercury. Due to heating during the operation of the tube, however, gases may be generated from the photoconductive layer, resulting in variation in internal gas pressure. It is desirable, therefore, to use a getter inside the X-transducer envelope for the purpose of absorbing the gases. However, the use of a getter has not been possible due to unavailability of a proper structure on which to mount it. If the getter were mounted on the mesh ring, flash heating of the getter after evacuation of the envelope to vaporize the getter and dispose it on the inside of the envelope, would contaminate the target electrode with the getter material. Operation of the target anode would be adversely affected. So adverse would be the effect, that getters have not been used in these X-transducers, despite the fact that the need for getters in the operation of the X-transducer is considerable. With the shield and annular ring mounted within the X-transducer envelope, means is available for mounting the getter at a distance from the target anode and for physically shielding the target electrode from vapor deposition. In accordance with the principles of the invention, getter means is, in fact, mounted in the preferred embodiment to be described below, on the cylinder at a region removed from the target anode.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings. In the drawings:

Figures 1, 2, 3A, 3B:
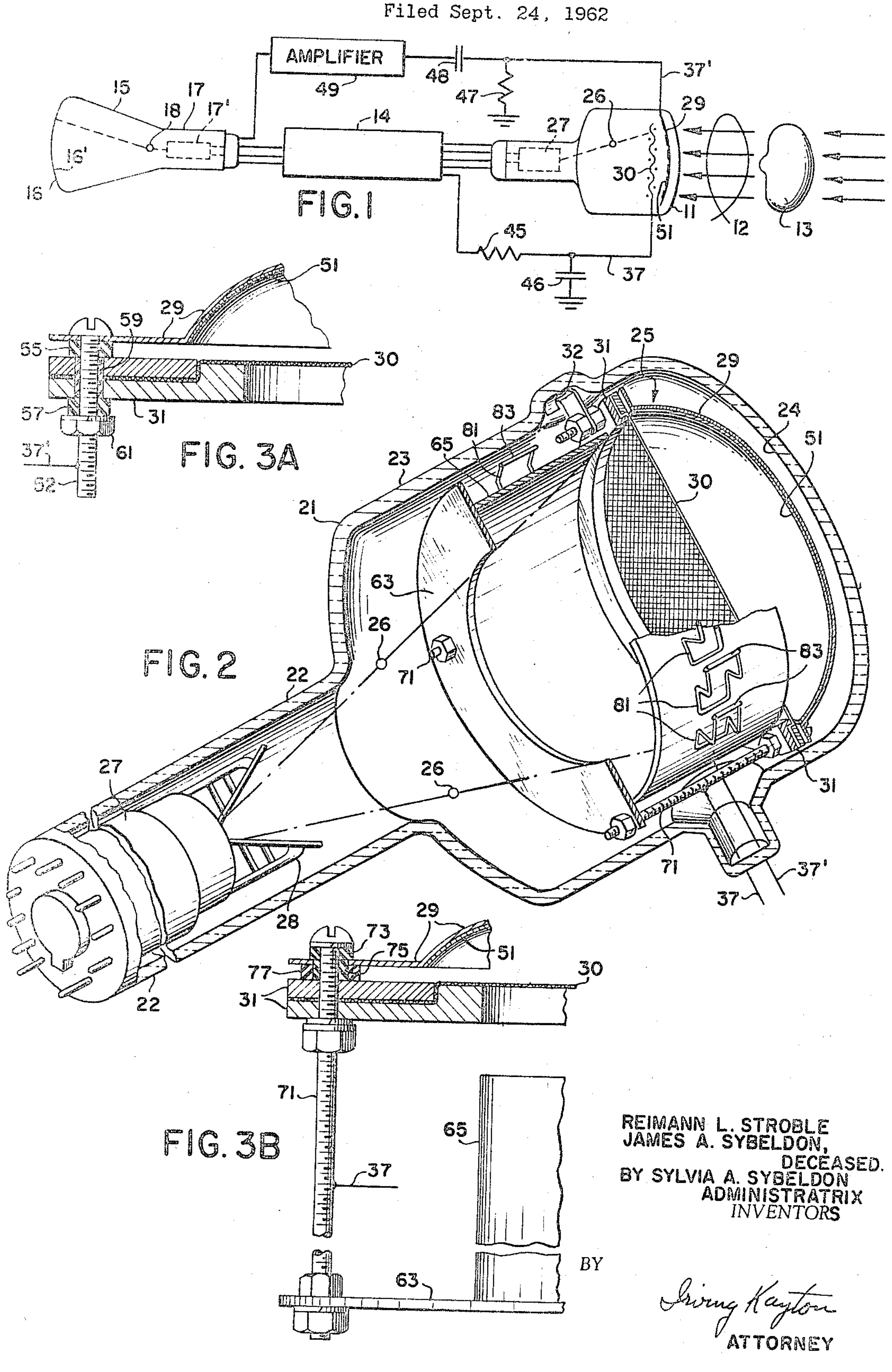
FIG. 1 is an illustrative partial circuit schematic of a prior art X-ray television system.
FIG. 2 is an X-ray image intensification transducer in accordance with the principles of the invention for use in a system such as that of FIG. 1.
FIGS. 3A and 3B are section details of mounting means of importance in the transducer of FIG. 2.

To facilitate an understanding of the principles of the invention, which in this embodiment is directed to an improvement in the X-ray image transducer tube of an image intensification system, a brief explanation of the operation of such an X-ray image intensification system will now be presented.

Referring to FIGS. 1 and 2, there is presented, for purposes of explanation, an image intensification system and X-transducer, respectively. In FIG. 1 there is schematically shown an X-ray transducer adapted to receive X-rays 12 emanating from any suitable source and carrying the latent image of an object 13 disposed in the path of the rays 12, between the ray source and the transducer 11. The transducer is adapted to produce electrical impulses corresponding with the characteristics of the latent image of the object 13 carried by the rays 12. The transducer is interconnected with a suitable translation system 14 for transmitting electrical impulses to, and applying the same for, the operation of a picture reproducing tube 15 of the sort commonly employed for television picture producing purposes, whereby the picture reproducing tube 15 may be operated for the reproduction of a visible picture corresponding with the latest picture image carried by the rays 12 and applied to the transducer 11.

In order to develop electrical impulses for the operation of the picture reproducing tube 15 to produce a visible picture corresponding with the latent image carried by the rays 12, the X-transducer 11, as shown more particularly in FIG. 2, comprises a sealed and evacuated envelope 21, preferably formed of glass to provide a tubular electron gun housing 22 of limited sectional size, at one end of the envelope, and an enlarged tubular portion 23, which merely by way of illustrative example may have a diameter of eight or twelve inches, forming a scanning chamber in open communication with the gun housing at one end thereof. Envelope 21 is under a vacuum of $10^{-5}$ to $10^{-6}$ millimeters of mercury. The envelope 21 includes an outwardly bowed end wall 24 sealing and enclosing the end of the scanning chamber remote from the gun housing. Latent image pickup means 25 is provided immediately within the end wall 24 in position disposed in the path of the image carrying rays 12, the pickup means being also disposed in alignment with the gun housing in position to be scanned by an electron beam 26 emitted by an electron beam gun structure 27 mounted with the housing 22.

The gun structure 27 may be of any convenient form and may be used in association with conventional horizontal and vertical electrostatic beam deflection plates 28; magnetic beam deflecting coils disposed outwardly of the gun housing may be used in conjunction with the gun for beam deflecting purposes, in accordance with well known electron scanning beam operating technique. The image pickup means 25, as shown, comprises a relatively thin layer 51 of X-ray sensitive, photoconductive material 51. Layer 51 has susbtantially uniform thickness and is coated upon a suitable support member which may conveniently comprises a plate 29 of electrical conducting material. Lead monoxide is a preferred photoconductor for layer 51 because of its excellent X-ray absorbing qualities.

In the absence of the X-rays to which it is responsive, the lead monoxide has impedance characteristics of such high order as to susbtantially but not completely prevent the flow of electrical current therethrough. When irradiated with X-rays, the impedance of the lead monoxide is reduced as a proportional function of incident X-ray intensity, so that the material becomes electrically conducting in proportion to the intensity of exciting X-rays impinging thereon.

Irradiation of the panel 51 by penetrating rays 12 carrying the latent image of the object 13 correspondingly alters the impedance of the crystalline material of the layer and thus applies a latent image of the object in layer 51, with the latent image being defined in terms of the variation in the impedance characteristics of each integral portion of the layer.

The system of FIGS. 1 and 2 includes means for successively and repetitively measuring the X-ray determined impedance of each integral portion of layer 51 in order to produce a transmissible signal corresponding with the impedance defined latent image in layer 51. To that end, the pickup means 25, in addition to layer 51 and its supporting plate 29, comprises a foraminous mesh screen 30 mounted in closely spaced relationship with respect to plate 29 in position overlying the surface thereof which carries layer 51.

Plate 29 comprises a flat relatively thin sheet of aluminum, copper, or other preferred electrical conducting material capable of supporting panel 51. It is bowed outwardly to conform to the same shape as end wall 24 of the envelope. The foraminous screen or mesh 30 comprises a sheet of fine mesh woven metal wire fabric, of the order of one hundred meshes per lineal inch; the plate 29 and screen 30 are electrically insulated from each other, and are supported at their peripheral edges in spaced apart relation of the order of one-eighth inch. The foraminous screen 30 is tautly stretched and secured upon a ring-like frame 31; the marginal edges of mesh 30 are electrically and mechanically secured on frame 31. Pedestal means may be provided for supporting frame 31 and plate 29 within the envelope 21. The pedestal means comprises four U-shaped members 32, evenly spaced about and bolted to frame 31 with the plane of the U perpendicular to the plane of frame 31 and the convex ends of the members extending radially outwardly from frame 31. Envelope portion 23 bulges outwardly at four locations defining a circumference within which frame 31 is concentrically disposed. These bulges are the externally disposed portions of four recesses in the inside of envelope portion 23 within which the convex portions of the U-shaped members are firmly seated.

When the X-ray transducer of FIGS. 1 and 2 is in ordinary and proper operation, a potential difference of desired value is maintained between plate 29 and mesh 30. The mesh may be connected to ground through a condenser 46. Plate 29 may be connected to ground, as by way of the conductor 37' and an output resistor 47. Typically, the mesh 30 may be maintained at 285 volts while plate 29 may be at 260 volts.

When layer 51 is dark, that is to say when it is not being irradiated by rays to which it is sensitively responsive, the voltage drop across layer 51 when it is scanned, is the dark current loss characteristic of the material of which layer 51 is formed, or there is only a small voltage developed across resistor 47. When the panel is irradiated by rays 12 to which it is sensitive, the conductivity across the panel, at the scanning spot, is directly proportional to the intensity of rays impinging at the scanning spot. Voltage developed across resistor 47 accurately defines the latent image imposed by exciting rays 12 in layer 51. Consequently, means are provided for controlling the operation of picture tube 15 in accordance with the voltage developed across resistor 47, by applying that voltage through a condenser 48 to any preferred amplifying system 49 for application on the control grid of the electron gun of the viewing tube, to thereby control the picture reproducing intensity of the electron beam 18.

Plate 29 is mounted upon and secured to, but electrically insulated from, mesh ring frame 31 at a plurality of locations. One location additionally serves as the coupling point for target output lead 37', as shown in FIG. 3A. Target lead 37' is secured to bolt 52. Bolt 52 passes through an aperture in target plate 29 and an aperture in ring frame 31. Insulating washers 55 and 57 are disposed about bolt 52 on opposite sides of ring 31, while an insulating cylindrical washer 59 is similarly disposed about bolt 52 in the aperture in ring 31 through which the bolt passes. Plate 29 is in direct physical and electrical contact with the head of bolt 52, whereby bolt 52 is at target electrode potential. Accordingly, washers 55, 57 and 59 electrically insulate bolt 52 and target plate 29 from mesh ring frame 31, but other insulating geometries may be used to accomplish the same end. Nut 61 screws down upon the washer, ring and target assembly to rigidly secure the assembly and to fix, at that location, the spacing between target 29 and mesh 30. As shown in FIG. 3A, mesh ring 31 comes in two planar sections between which fits the outermost peripheral edge of mesh 30. Accordingly, bolt 52 and nut 61 serve additionally to rigidly secure, through the intermediary of the insulators 55, 57 and 59, the mesh 30 to ring 31. The target electrode 29 is secured by a plurality of other means at other locations to ring 31. These other means, however, are at the electrical potential of the mesh and perform another function, as will be seen shortly.

Bolt 52, nut 61 and target lead 37 constitute the assembly which shows up on the TV monitor as a dark, spurious image which is eliminated in accordance with the principles of the invention. The structure now to be described is responsible for the elimination of this spurious image as well as the white halo characteristically visible on the TV monitor screen disposed outwardly of ring 31.

Turning attention once again to FIG. 2, the structure, in accordance with the principles of the invention, responsible for the elimination of these spurious signals, comprises annular ring 63 and cylinder 65. Both are of a non-magnetic, electrically conductive sheet metal such as stainless steel or titanium. The plane of annular ring 63 is perpendicular to the longitudinal axis of cylinder 65 and parallel to the plane of mesh 30. It is contiguous to one circular edge of cylinder 65 in a manner such that the circular edge of cylinder 65 is substantially concentric to and disposed between the inner and outer edges of annular ring 63. The opposite end of cylinder 65 is located closely adjacent the inner edge of mesh ring 31.

One edge of cylinder 65 is secured to the face of annular ring 63 by spot welding at a plurality of locations. The ring 63-cylinder 65 assembly is rigidly secured within the tube envelope at three points on mesh ring 31. Three rods 71 are bolted to annular ring 63 external to cylinder 65, and are disposed 120° apart on the ring. These bolts are in turn secured to mesh ring 31 in manner shown in greater detail in FIG. 3B. As shown in FIG. 3B, each of bolets 71 is in electrical contact with, and passes through mesh ring 31 and annular ring 63. Bolt 71 also passes through target plate 29 but is electrically insulated from target 29 by the washers 73, 75 and 77, washers 73 and 75 may be formed as a single integral shoulder insulator. Washer 77 additionally serves to insulate target 29 from ring 31. As a consequence, all of bolts 71 are at the same electrical potential as mesh 30; because of the direct contact of bolts 71 with ring 31, both annular ring 63 and cylinder 65 are at the same level of potential as the mesh electrode. The mesh electrode output lead 37 is secured to one of bolts 71 and passes through the envelope at the same region that target lead 37' does, with both of them applied to the circuitry of the system as shown in FIG. 1.

The annular ring 63 and cylindrical shield 65 need not be thick, and in the eight-inch tube here under discussion, may have a sheet thickness of approximately 10 to 12 mils, and in any event need be no thicker than is appropriate for physical self-support.

As seen in FIG. 2, annular ring 63 and cylinder 65 prevent electron beam 26 from reaching the target lead assembly or the glass envelope, even at the widest deflection. This is because scan deflection outward of the inner edeg of mesh ring 31 results in interception of electron beam 26 by annular ring 63, or cylinder 65, or both.

Disposed about the outside surface of cylinder 65 is a multiplicity of wire mounting means 81 for supporting barium aluminum getting rods 83. Support wires 81 are disposed on cylinder 65, a substantial distance from target plate 29 and lead monoxide coating 51. Each of supports 81 is welded to the outer face of cylinder 65. The barium-sluminum getter rods 83 secured at the other ends of the wire support means are mounted in the tube during the fabrication of the tube. However, once the tube is completely assembled and properly evacuated, the getter rod is flash heated by radio frequency heating to a temperature of between 900° to 1100° C.; this serves to vaporize the barium from the barium-aluminum alloy, which vapor deposits itself upon the inside surface of the tube envelope. The barium in this thin layer, then, functions as a getter during the subsequent operation of the tube. Because of the substantial distance between getter mounting means 81 and the target 29 and layer 51, and because cylinder 65 serves as a physical shield, vaporization of the barium occurs without any significant amount of it being deposited upon the target-layer assembly.

While the principles of the invention have now been made clear in an illustrative embodiment, there will be immediately obvious to those skilled in the art many modifications in structure, arrangement, propotions, the elements, materials, and components, used in the practice of the invention, and otherwise, which are particularly adapted for specific environments and operating requirements, without departing from these principles. The appended claims are therefore intended to cover and embrace any such modifications, within the limits only of the true spirit and scope of the invention.

What is claimed as new and desired to be secured by Letters Patent of the United States is:

1. An X-ray image transducer tube for use in an image intensification system comprising: a sealed and evacuated tube envelope; an anode electrode comprising a target plate of high electrically conductive material, a first face of said target plate being maintained at a first electrical potential; a layer of lead monoxide coating a second face of said target plate; a mesh electrode formed of finely woven metallic wires mounted upon and tightly stretched across a ring-like mounting means, said mesh electrode being maintained at a second electrical potential different from said first electric potential of said target plate; means for electrically insulating said target plate from and securing said target plate to, said mesh ring; means for supporting said mesh ring within and toward one end of said tube; a target electrode output lead disposed at the physical periphery of said target plate; an electron gun disposed at the opposite end of said tube from said mesh ring and disposed relative to said target electrode for scanning said lead monoxide layer with an electron beam; an annular ring of non-magnetic electrically conductive material disposed between said electron gun and said target electrode in a plane parallel to said mesh electrode with the inner edge of said annular ring positioned relative to said electron beam and said target output lead to preclude said electron beam from striking said target output lead; and means for maintaining said annular ring at the same electrical potential as said mesh electrode.

2. An X-ray image transducer tube for use in an image intensification system comprising: a sealed and evacuated glass tube envelope; an anode electrode comprising a target plate of highly electrically conductive material, a first face of said target plate being maintained at a first electrical potential; a layer of lead monoxide coating a second face of said target plate; a mesh electrode formed of finely woven metallic wires mounted upon and tightly stretched across a ring-like mounting means, said mesh electrode being maintained at a second electrical potential different from said first electrical potential of said target plate; means for electrically insulating said target plate from and securing said target plate, said mesh ring; means for supporting said mesh ring within and toward one end of said tube; a target electrode output lead disposed at the physical periphery of said target plate; an electron gun disposed at the opposite end of said tube from said mesh ring and disposed relative to said target electrode for scanning said lead monoxide layer with an electron beam; a hollow cylinder of non-magnetic electrically conductive material disposed between said electron gun and said mesh ring with one end of said cylinder closely adjacent said mesh ring and with the longitudinal axis of said cylinder perpendicular to the plane of said mesh electrode, said cylinder circumscribing a volume through which said electron beam passes while scanning said lead monoxide layer, and being additionally positioned to intercept and carry away the current of said electron beam in a region to preclude said electron beam from striking said target output lead and said glass envelope in the region adjacent said target plate; and means for maintaining said cylinder at the same electrical potential as said mesh electrode.

3. An X-ray image transducer tube as recited in claim 2 including a multiplicity of getter mounting means disposed circumferentially about the outside of said cylinder at a distance from said lead monoxide layer, and a multiplicity of barium-aluminum getter rods secured to said multiplicity of getter mounting means.

4. An X-ray image transducer tube for use in an image intensification system comprising: a sealed and evacuated tube envelope; an anode electrode comprising a target plate of highly electrically conductive material, a first face of said target plate being maintained at a first electrical potential; a layer of lead monoxide coating a second face of said target plate; a mesh electrode formed of finely woven metallic wires mounted upon and tightly stretched across a ringlike mounting means, said mesh electrode being maintained at a second electrical potential different from said first electric potential of said target plate; means for electrically insulating said target plate from and securing said target plate to, said mesh ring; means for supporting said mesh ring within and toward one end of said tube; a target electrode output lead disposed at the physical periphery of said target plate; an electron gun disposed at the opposite end of said tube from said mesh ring and disposed relative to said target electrode for scanning said lead monoxide layer with an electron beam; an annular ring of non-magnetic electrically conductive material disposed between said electron gun and said target electrode in a plane parallel to said mesh electrode with the inner edge of said annular ring positioned relative to said electron beam and said target output lead to preclude said electron beam from striking said target output lead; a hollow cylinder of non-magnetic electrically conductive material disposed between said electron gun and said mesh ring with one end of said cylinder closely adjacent said mesh ring and with the longitudinal axis of said cylinder perpendicular to the plane of said mesh electrode, said cylinder circumscribing a volume through which said electron beam passes while scanning said lead monoxide layer, and being additionally positioned to intercept said electron beam in a region to preclude said electron beam from striking said target output lead; and means for maintaining said cylinder and annular ring at the same electrical potential as said mesh electrode.

5. An X-ray image transducer tube as recited in claim 4 including a multiplicity of getter mounting means upon which are mounted barium-aluminum alloy getter rods, secured to at least one of said non-magnetic highly conductive structures disposed between said electron gun and said target plate electrode.

6. An X-ray image transducer tube for use in an image intensification system comprising:

(a) a sealed and evacuated tube envelope,
(b) a target plate electrode mounted within and disposed at one end of said envelope,
(c) a photoconductive layer disposed on one face of said target plate electrode,
(d) an electron gun mounted within and located at the other end of said envelope from said target plate electrode, said electron gun being disposed to scan said layer with an electron beam,
(e) and means maintained at a different potential than the target plate electrodes and disposed within said tube envelope between said electron gun and said target plate electrode for intercepting and conducting away the current of said electron beam scanning said photoconductive layer when the deflection of said electron beam is sufficiently great to carry the scan beyond the peripheral edge of said target plate electrode,
(f) said intercepting and conducting away means being a nonmagnetic electrically conductive structure having a geometry and spacing relative to said target plate electrode and to said electron gun insuring interception of said electron beam whenever said electron beam's deflection would bring said beam near the peripheral edge of said target plate electrode or outwardly of said target plate electrode, and (g) a getter mounted on said nonmagnetic electrically conductive structure.

References Cited

UNITED STATES PATENTS

| | | | |
|---|---|---|---|
| 2,638,559 | 5/1953 | Giacchetti | 313—174 X |
| 2,654,853 | 10/1953 | Weimer | 313—65.1 |

| | | | |
|---|---|---|---|
| 2,727,173 | 12/1955 | Longini | 313—65 X |
| 2,945,973 | 7/1960 | Anderson | 313—65.1 |

HERMAN KARL SAALBACH, *Primary Examiner.*

DAVID J. GALVIN, *Examiner.*

S. CHATMON, Jr., *Assistant Examiner.*